United States Patent [19]

Wakabayashi et al.

[11] Patent Number: 4,669,073
[45] Date of Patent: May 26, 1987

[54] OPTICAL DISK DRIVE APPARATUS

[75] Inventors: Noriaki Wakabayashi, Hirakata; Hiromichi Ishibashi, Toyonaka, both of Japan

[73] Assignee: Matsushita Electric Industrial Co., Ltd., Osaka, Japan

[21] Appl. No.: 696,243

[22] Filed: Jan. 29, 1985

[30] Foreign Application Priority Data

Jan. 31, 1984 [JP] Japan .................. 59-16263
Aug. 24, 1984 [JP] Japan ................. 59-175932
Aug. 24, 1984 [JP] Japan ................. 59-175931

[51] Int. Cl.$^4$ ............................................ G11B 7/09
[52] U.S. Cl. ................................. 396/45; 369/111; 250/201
[58] Field of Search ................. 369/111, 44, 45, 32, 369/112, 43, 219, 222; 250/201, 202; 350/286, 287, 252, 255

[56] References Cited

U.S. PATENT DOCUMENTS

| | | | |
|---|---|---|---|
| 3,842,197 | 10/1974 | Broussaud | 369/111 |
| 4,004,081 | 1/1977 | Zorn | 369/111 |
| 4,321,701 | 3/1982 | Arquie | 369/45 |
| 4,403,316 | 9/1983 | Veerdonk | 369/44 |
| 4,408,311 | 10/1983 | Suzuki | 369/43 |
| 4,544,838 | 10/1985 | Musha | 369/44 |
| 4,564,931 | 1/1986 | Ohara | 369/111 |

FOREIGN PATENT DOCUMENTS 50-34507  4/1975  Japan .

*Primary Examiner*—Alan Faber
*Attorney, Agent, or Firm*—Wenderoth, Lind & Ponack

[57] ABSTRACT

An optical disk drive apparatus, for data or information disks of which the data or information are able to record or playback on each of the recording tracks, comprises an optical rotary pick-up head actuator for both seeking and following to the recording track to read or write data signals by a light beam. The light beam is injected along the axis of rotation of the optical rotary pick-up head actuator; guided through a stick-shaped prism in cantilever form which is fixed by one side on the optical rotary pick-up head actuator and is unsuspended by the other side; and focused upon the recording surface of the disk through an objective lens which can be rotatively moved and controlled with the optical rotary pick-up head actuator in the direction to seeking the tracks. An reflective light beam from the recording surface of the disk is guided in the reverse order and is taken out from the center axis of rotation.

11 Claims, 21 Drawing Figures

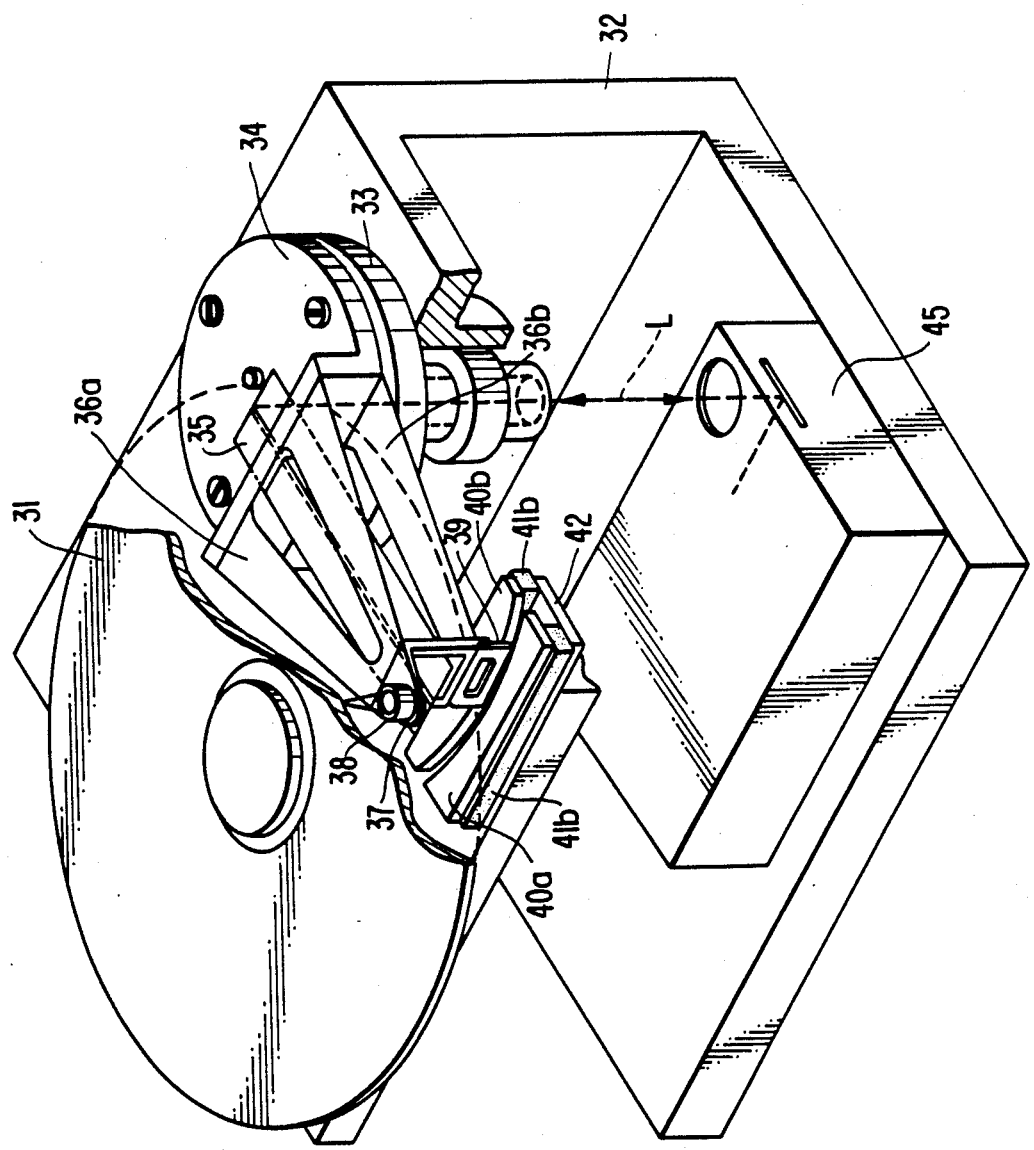

OPTICAL DISK DRIVE APPARATUS

BACKGROUND OF THE INVENTION

1. Field of the Invention

This invention relates to an optical disk drive apparatus used for data or information memory systems for recording onto and playing back from the surface of a disk recording medium data signals, by using a light beam, for example, a laser beam. More particularly, the invention relates to an optical pick-up head actuator which carries an optical system, and guides a light beam to a target recording track of an optical disk.

2. Description of the Prior Art

The conventional optical disk drive apparatus is provided with a focusing actuator for moving an objective lens in a direction perpendicular to a recording surface of an optical disk to focus a light beam (e.g. laser beam) upon the recording surface; a tracking actuator for moving the objective lens in a direction parallel to the disk and transverse to the recording tracks to let the light beam follow a target track; and a seeking actuator (ordinary linear motor) for carrying an optical pick-up head block, which includes the focusing actuator, the tracking actuator and other optical components and devices (such as a mirror, a prism, a semi-conductor laser) and a detector, in a radial direction of the disk for seeking the target track to be read or written. The weight of the optical pick-up head block is usually heavy because of some heavy components mounted thereon, especially magnetic circuits of the focusing and tracking actuators. The total moving mass including the mass of means for carrying the optical pick-up head block in the seeking actuator is approximately between 200 and 1000 grams. Therefore, it is very difficult for the conventional apparatus to achieve a high speed track access. If the optical pick-up head block was subjected to an acceleration of 10G (G is the acceleration of gravity), a powerful thrust about 20-100N (Newton) would be required for the seeking actuator. A linear voice coil motor, for example, meets this requirement, but it is very large in size and weight. With these actuators, the optical disk drive apparatus would hardly be made compact or light, and would hardly diminish power dissipation.

On the other hand, the large acceleration for achieving high speed access to the target track brings about various difficulties. The objective lens is usually suspended by flexible members in the magnetic circuit of the focusing actuator to be moved smoothly in a direction perpendicular to the disk surface. The objective lens is also usually suspended by other flexible members directly or indirectly (through the focusing actuator) in the magnetic circuit of the tracking actuator and is also moved smoothly in the direction of the track crossing. Therefore, the large acceleration causes the objective lens to vibrate furiously. This makes the optical axis of the objective lens incline transiently, and continue for a while after access. Consequently, with the large acceleration the optical system becomes unstable, for example, unable to focus, and takes a long time for setting after access.

Another prior art approach to the optical pick-up head block is shown in Japanese Laid-open Application 50-34507 by Koizumi for an optical disk drive. Koizumi proposes an optical pick-up head block that has compact and low-weight moving portions, which can easily replace a laser beam source. Embodying the objective above, the laser beam source is mounted on the stationary portions, and the optical pick-up head block comprises a vacant prop and a vacant arm which is attached to the prop. The vacant arm is able to rotate around the axis of the prop, and is equipped with optical devices such as lenses, prisms, and mirrors. The laser beam passes through the vacant prop. Despite these proposals, there will exists many difficulties for obtaining a high speed track access. One is that the moving portions' mass is still large, because the vacant arm includes many optical components and a focusing means (for example, a focusing actuator) which are not mentioned. Another is that high stiffness is hardly achieved with the vacant arm, because the vancant low weight arm has to be comprised of thin and light materials. Therefore, the powerfull acceleration causes the moving portions including the arms to undergo serious vibration. Moreover, because of a lack of stiffness, the closed-loop servo control cannot achieve very accurate trackability for track following.

SUMMARY OF THE INVENTION

An object of the present invention is to provide an optical disk drive apparatus which has a remarkably reduced moving mass (inertia) for achieving high speed access to a target track.

Another object of the present invention is to present a high stiffness for the optical pick-up head block, and to prevent vibration of the optical systems and to prevent the axis of the objective lens from being inclined when a large acceleration is present.

Still another object of the present invention is to achieve high stability and fine trackability for focusing and tracking performance.

A further object of the present invention is to provide an optical disk drive apparatus which has a compact and light optical pick-up head block, and consumes a low amount of power.

These objects can be accomplished by an optical disk drive apparatus comprising: an optical disk for information storage using a light beam; a rotating means for causing the optical disk to rotate continuously; an objective lens focusing said light beam upon the recording surface of said optical disk; a rotary actuator moving and controlling said objective lens rotatively around the center axis of rotation in the direction of crossing tracks on said recording surface of said optical disk for both track seeking and track following; and a stick-shaped prism mounted in cantilever form at one side upon said rotary actuator through a rotary attachment which is fixed on and rotated with said rotary actuator, and being unsuspended by the other side adjacent said objective lens, and said stick-shaped prism guiding within itself said light beam which is injected along the center axis of said rotary actuator's rotation, and guiding said light beam to said objective lens to be focused upon said recording surface of said optical disk, and also guiding back a reflective light beam from said recording surface of said optical disk in a reverse order.

The above and the other objects, features and advantages will be apparent from consideration of the following description taken in connection with the accompanying drawing in which:

BRIEF DESCRIPTION OF THE DRAWINGS

FIG. 4 is a partial perspective view of an actual construction of an optical disk drive embodying this invention;

DESCRIPTION OF THE PREFERRED EMBODIMENTS

Figure 1:
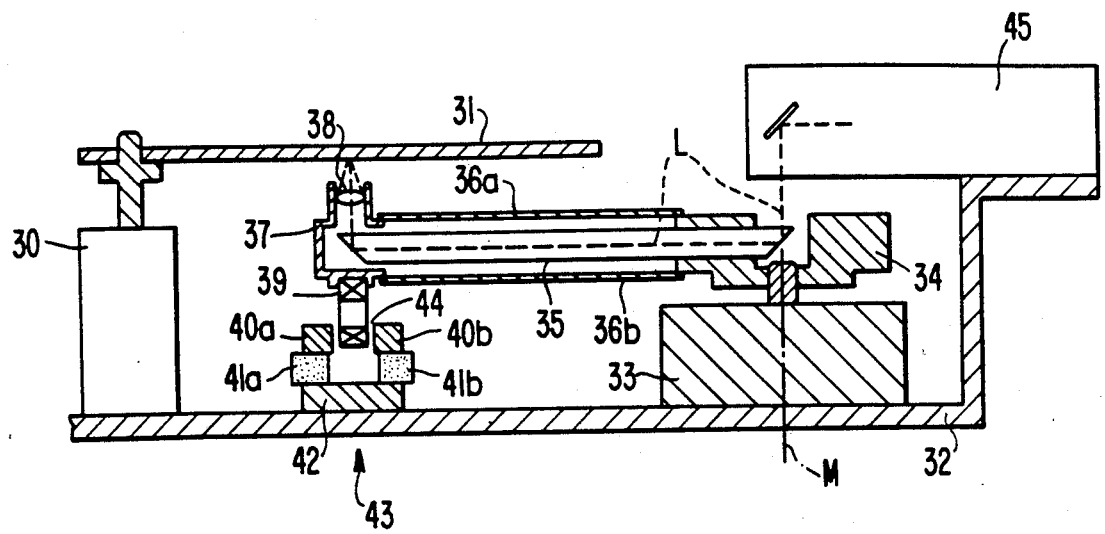
FIG. 1 is cross-sectional view of a basic construction of an optical disk drive apparatus embodying this invention.
Figure 2:
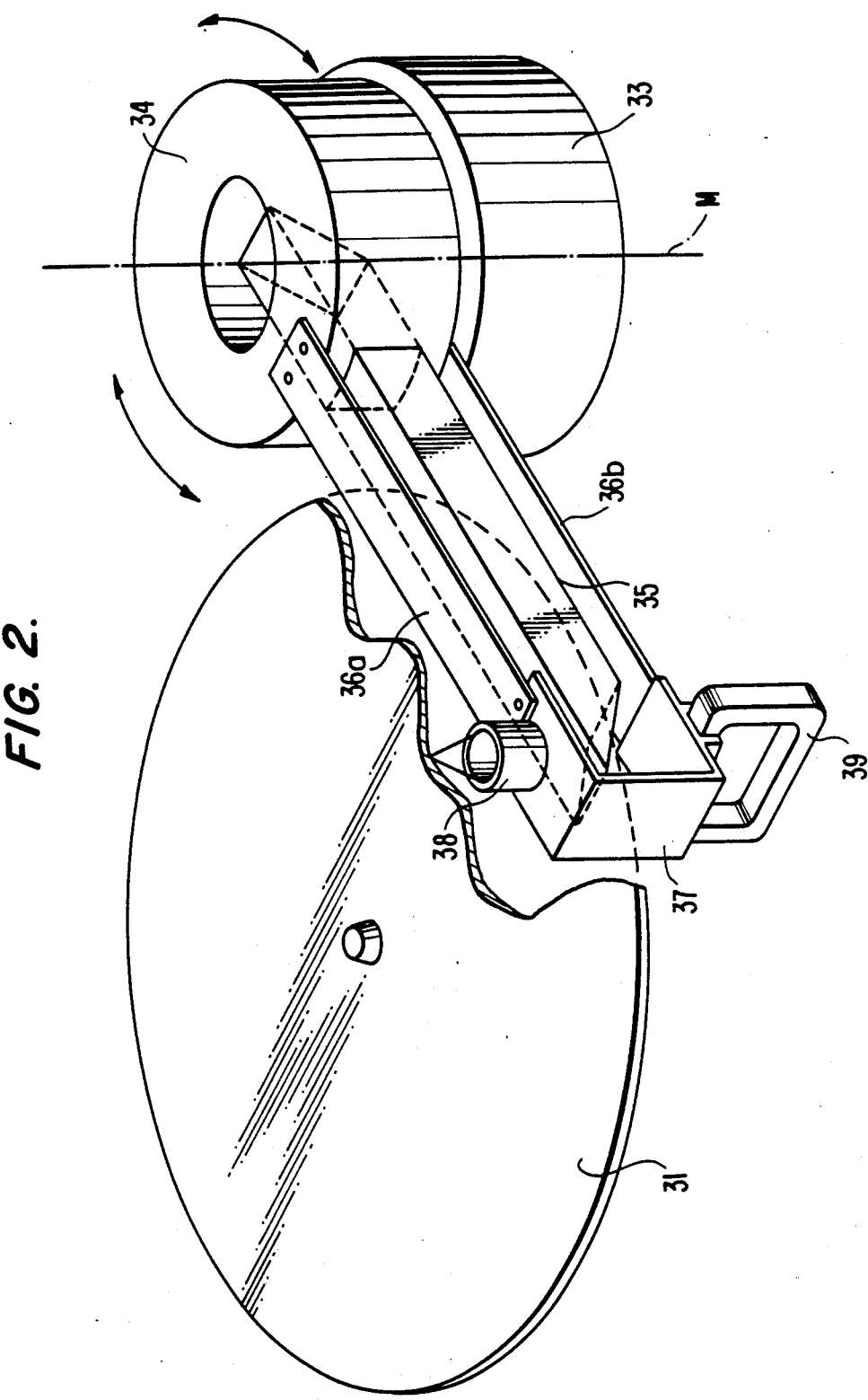
FIG. 2 is a partially perspective view of the basic construction of the optical disk drive embodying this invention, illustrated for better understanding of the embodiment shown in FIG. 1.

Referring now to the drawings, FIG. 1 and FIG. 2 show a basic construction embodying this invention. An optical disk 31 is rotated continuously by a rotary motor 30 fixed on a chassis 32. An optical rotary pick-up head actuator comprises a rotary actuator 33 and a rotary attachment 34 which is fixed on and rotated with the rotary actuator 33. M is a center axis of the rotation. This optical rotary actuator performs simultaneous movements for seeking (track access), and tracking (track following). Each stick-shaped prism 35 in cantilever form and parallel elastic plates 36a, 36b are fixed at one end to the rotary attachment 34 end remains free. On the tip end (free end) of the parallel elastic plates 36a, 36b, an objective lens 38 and a focusing coil 39 are mounted and fixed via an attachment member 37. The focusing coil 39 is inserted into an air gap 44 formed by a focusing magnetic circuit consisting of magnetic yokes 40a, 40b, permanent magnets 41a, 41b and a magnetic yoke 42. A focusing actuator 43 is comprised of the focusing coil 39, which is movable, and the focusing magnetic circuit mentioned above, which is fixed on the chassis 32. A fixed optical block 45 includes most of the heavy optical components such as a semi-conductor laser, a collimator lens, half mirror prisms, a beam splitter prism and beam detectors (which are not illustrated in FIG. 1 and FIG. 2). A broken line L in FIG. 1 shows an axis of a light beam path.

The light beam radiated, for example, by a semiconductor laser source in the fixed optical block 45 is injected along the center axis of rotation M, and is guided into the stick-shaped prism 35, where it is reflected by a refecting surface formed on one edge of the stick-shaped prism 35. The light beam is then once again reflected by another reflecting surface formed on the other end (the tip end) of the stick-shaped prism 35, and is focused upon the recording surface of the optical disk 31 through the objective lens 38. The reflected light beam from the recording surface of the optical disk 31 returns in the reverse order to the fixed optical block 45 along the axis of the light beam path shown in the broken line L in FIG. 1.

The partially perspective view shown in FIG. 2 is illustrated to bring about a better understanding of the basic construction embodying this invention. Therefore, FIG. 2 mainly illustrative of the moving parts and omits the chassis 32 and the fixed optical block 45 in FIG. 1. The common numbers between FIG. 1 and FIG. 2 show the same components.

In the embodiment mentioned above, the objective lens 38 is adjusted to be focused by the focusing actuator 43. The focusing coil 39, being fed current, is moved and controlled with the attachment member 37 and the objective lens 38 to be focused in a direction perpendicular to the surface of the optical disk 31. The attachment member 37, fastened on the parallel elastic plates 36a, 36b, is able to move freely, but is subject to a small stroke, in that direction. On the other hand, the control for following the target track (tracking) and the control for seeking the target track (track access) are both achieved by the rotary actuator 33 only.

Consequently, the objective lens 38, the attachment member 37, the focusing coil 39, the parallel elastic plates 36a, 36b, the stick-shaped prism 35 are controlled and moved rotatively all together by the rotary actuator 33. The attachment member 37 including the objective lens 38 and the focusing coil 39, being fastened on the parallel elastic plates 36a, 36b, are never caused to vibrate or resonate, and therefore are controlled with high stability even under furious movement or acceleration by the rotary actuator 33, because the parallel elastic plates 36a, 36b posess extremely high stiffness in the direction of seeking or tracking. Furthermore, the stick-shaped prism in cantilever form 35 guiding the light beam is preferable with regard to stiffness because the stick-shaped prism consists of a rigid stick-shaped material. Moreover, the prism has the advantage of achieving high speed track access due to its low mass (inertia) structure and, because it is comprised of nothing except a simple rigid stick-shaped material as mentioned above.

When employing a structure which includes a vacant arm as the light beam path and mirrors fixed at both edges of the vacant arm instead of the stick-shaped prism, the success in reducing the mass (inertia) of the structure is hardly achieved, because the thick and solid material is desirable for the arm in the aspect of stiffness, and because a heavy complicated means is desirable for fixing mirrors precisely. Consequently, the stick-shaped prism in cantilever form is preferable for the structure of the vacant arm.

Figure 3:
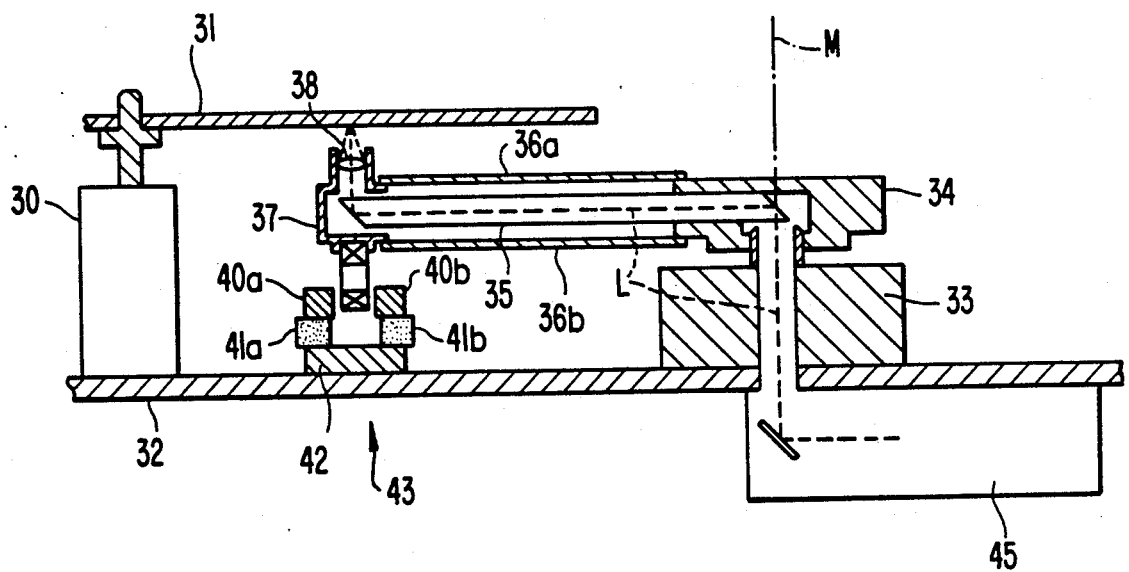
FIG. 3 is a cross-sectional view of another basic construction of an optical disk drive apparatus embodying this invention.

FIG. 3 shows another basic construction embodying this invention. In this embodiment, the fixed optical block 45 is placed under the rotary actuator 33. The arrangement is the same as that shown in FIG. 1 except for the fixed optical block 45, and the operation is the same as that shown in FIG. 1. The numbers of the components in FIG. 3 are common to those in FIG. 1.

FIG. 4 shows an actual construction embodying this invention. The common numbers between FIG. 4 and FIGS. 1, 2 and 3 show the same components. In this embodiment in FIG. 4, the parallel elastic plates 36a, 36b are V-shaped to increase the stiffness in the direction of rotation (the direction of tracking or seeking). All of the components in FIG. 4 have equivalent functions to those of the basic embodiment shown in FIGS. 1, 2 and 3.

FIGS. 5(a)–5(f) show several embodiments for the stick-shaped prism in cantilever form. In the embodiment in FIG. 5(a), the stick-shaped prism 51 has a sectional shape of a trapezoid and has two reflecting surfaces 52, 53 on both its edges placed upon the center axis of rotation M and upon the center axis of the objective lens 38 respectively. This embodiment is shown in FIGS. 1 and 2. The light beam from the fixed optical block is injected along the center axis of rotation M; reflected by the reflecting surface 52; guided into the stick-shaped prism 51; reflected again by the reflecting surface 53 formed on the other end (the tip end) of that prism 51; and finally focused upon the optical disk through the objective lens 38. The reflective light beam from the optical disk returns in the reverse order. The axis of the light beam path is shown as a broken line L in FIG. 5(a).

Figure 5A:
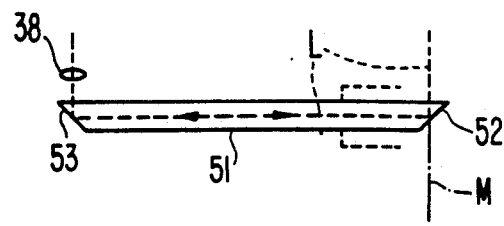
FIGS. 5(a)–5(f) are cross-sectional views of embodiments of stick-shaped prism in cantilever form, which can be applied to the embodiment shown FIGS. 1, 2, 3 and 4.
Figure 5B:
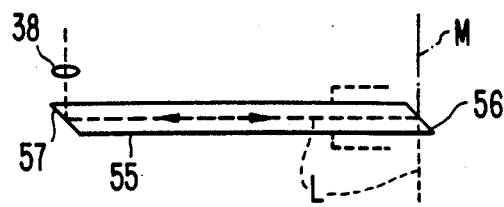

In the embodiment in FIG. 5(b), the stick-shaped prism has a sectional shape of a parallelogram and has also two reflecting surface 56, 57 for the light beam on both its edges placed upon the center axis of rotation M and upon the center axis of the objective lens 38 respectively. This embodiment is shown in FIGS. 3 and 4. The difference between the embodiment of FIG. 5(a) and that in FIG. 5(b) is the direction of the reflecting surfaces 52, 56 placed on the center axis of rotation M. Both embodiments are basic for the stick-shaped prism in cantilever form.

Figure 5C:
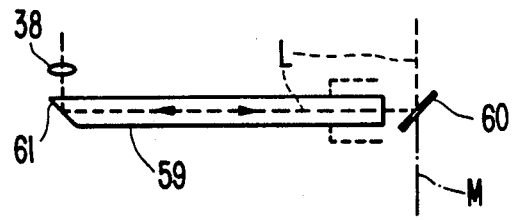

Another embodiment is shown in FIG. 5(c). In this embodiment, the stick-shaped prism 59 has no reflecting surface on its edge placed on the center axis of rotation M. A reflecting mirror 60 is placed on the center axis of rotation M instead of on the reflecting surface. In this case, the light beam from the fixed optical block is reflected by this reflecting mirror 60; guided into the prism 59; reflected by the reflecting surface 61 formed on the other edge (the tip edge) of the prism 59; and finally focused upon the optical disk through the objective lens 38. This embodiment suggests that the reflecting surface formed on the edge placed on the center axis of rotation M is not theoretically perfect in the aspect of stiffness or low inertia for the stick-shaped prism in cantilever form. However, the embodiments in FIGS. 5(a) and 5(b) may be preferable to this embodiment in the aspect of simplification.

Figure 5D:
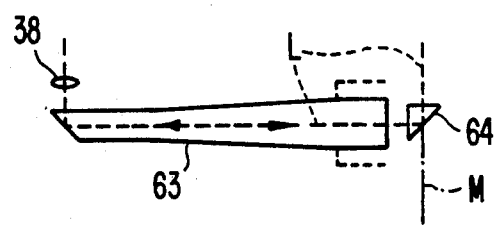

Still another embodiment in FIG. 5(d) is also a modification of that in FIG. 5(c). In this embodiment, the stick-shaped prism 63 is slender at the tip portion (toward the side of the objective lens 38), and is thick near the center axis of rotation M. This shape of the stick-shaped prism 63 is preferable to that of uniform thickness in the aspects of high stiffness and low inertia. The prism mirror 64 reflects the light beam as does the reflecting mirror 60 shown in FIG. 5(c).

Figure 5E:
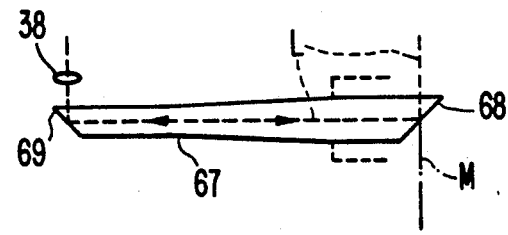
Figure 5F:
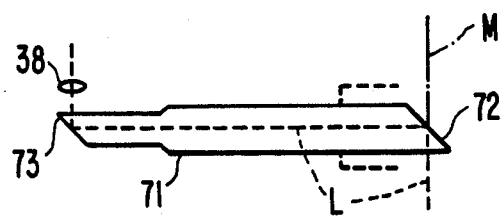

A further embodiment in FIG. 5(e) is a modification of those in FIGS. 5(a) and 5(d). In this embodiment, the stick-shaped prism 67 has a sectional shape of a quasi-trapezoid and has two reflecting surfaces 68, 69 on both its edges. This embodiment has the advantages of those shown in FIGS. 5(a) and 5(d). A further embodiment in FIG. 5(f) is a modification of that in FIG. 5(e). In this embodiment, the stick-shaped prism 71 has a sectional shape of a quasi-parallelogram, and has two reflecting surfaces 72, 73. The direction of the reflecting surface 72 differs from that in FIG. 5(e).

In all of the embodiments show in FIG. 5a–FIG. 5f, the stick-shaped prisms in cantilever form are not necessarily composed of one solid material. The prism can be composed of plural transparent materials in one body attached by an adhesive agent.

Figure 6:
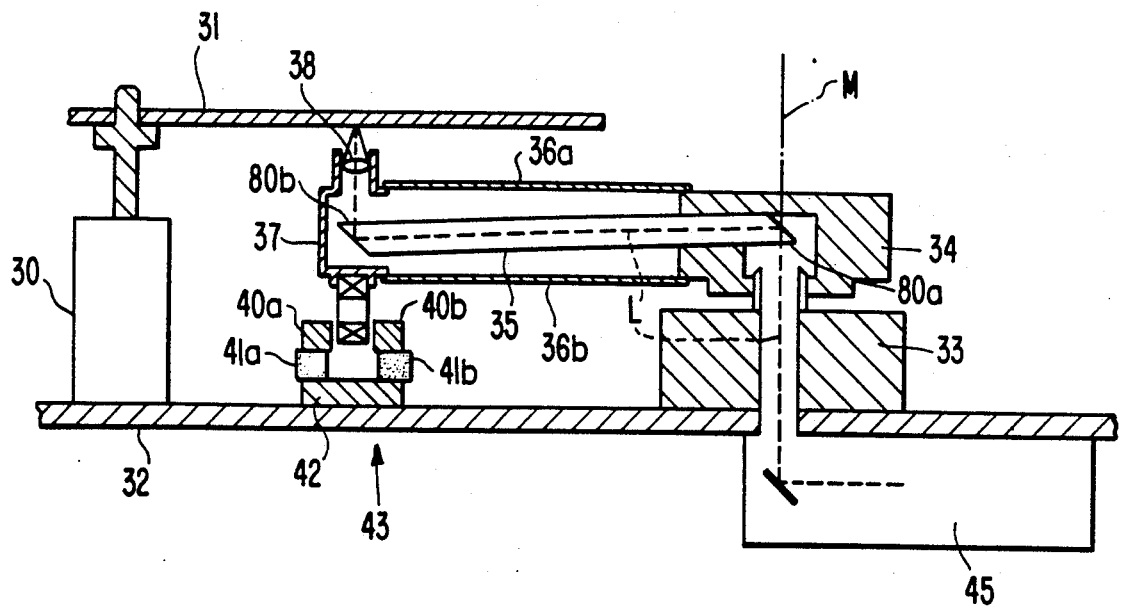
FIG. 6 is a cross-sectional view of another construction of an optical disk drive apparatus embodying this invention.

FIG. 6 shows another construction embodying this invention which arranges the stick-shaped prism in cantilever form 35 in an inclined posture. Basic arrangements of this embodiment are similar to those shown in FIGS. 1, 2 and 3, except for the stick-shaped prism 35. The crux of this embodiment is that the stick-shaped prism 35 is attached to the rotary element 34 in the inclined posture against the plane of its rotation, so that surfaces 80a, 80b on the stick-shaped prism 35 where the light beam passes hrough are not perpendicular to the axis of the light beam. If the surfaces 80a, 80b are perpendicular to the axis of the light beam, the surfaces 80a, 80b make slight surface-reflective light beams resulting in undesirable images formed on the surface of detector which detects the signals from the optical disk. Moreover, these undesirable images move rotatively on the surface the detector according to rotative movement of the stick-shaped prism 35. These undesirable images are harmful to detecting data signals or controlling a closed-loop servo.

Figure 7A:
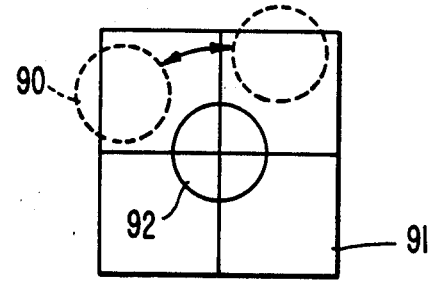
FIGS. 7(a) and 7(b) are enlarged partial views of a signal detector for the light beam, illustrating the undesirable image around the surface of the detector.
Figure 7B:
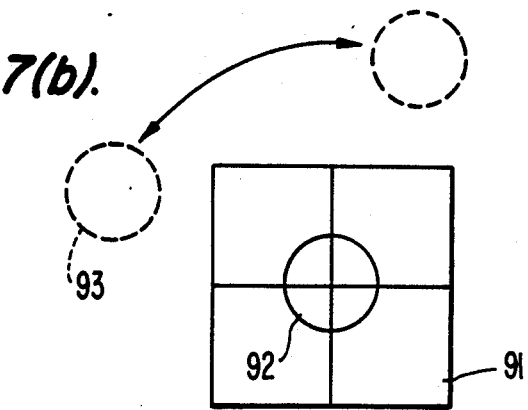
Figure 8A:
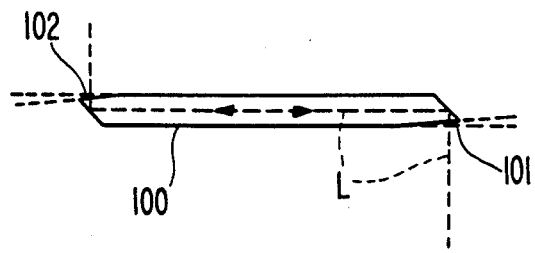
FIGS. 8(a)–8(h) are cross-sectional views of further embodiments of the stick-shaped prism in cantilever form, which can be applied to this invention.
Figure 8B:
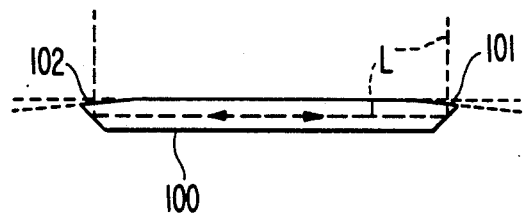
Figure 8C:
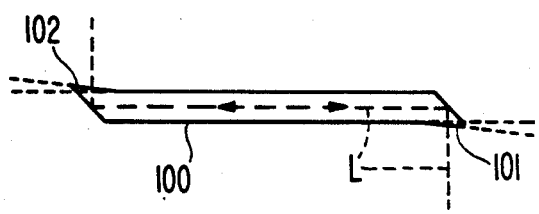
Figure 8D:
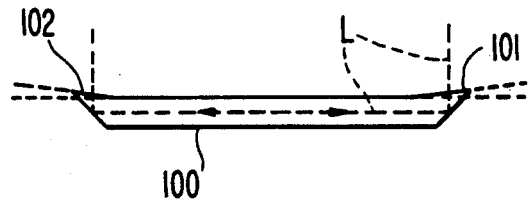
Figure 8E:
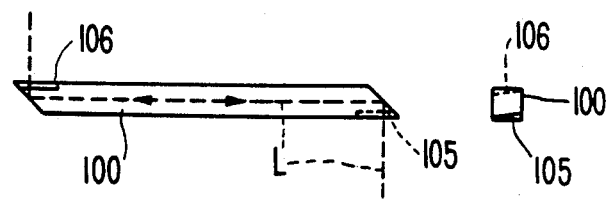
Figure 8F:
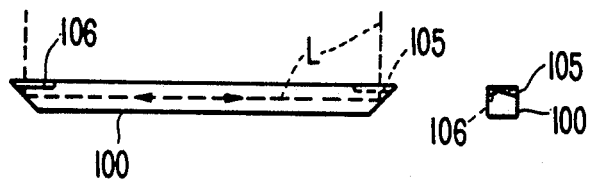
Figure 8G:
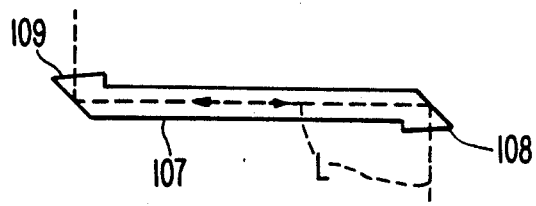
Figure 8H:
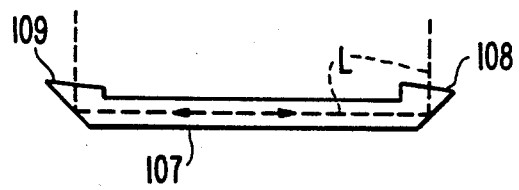

FIGS. 7(a) and 7(b) show the undesirable image above mentioned upon or around the surface of the detector. FIG. 7(a) shows the undesirable image 90 upon the surface of detector 91, moving rotatively according to rotative movement of the stick-shaped prism in cantilever form 35. If the surfaces 80a, 80b (in FIG. 6) are perpendicular to the axis of the light beam, the undesirable image 90 is apt to move on the surface of detector 91 in FIG. 7(a). A proper image 92 from the surface of the optical disk is always centered on the surface of the detector 91 for all movements. If the surfaces 80a, 80b (in FIG. 6) are not perpendicular to the axis of the light beam, the undesirable image 93 moves around the surface of detector 91, but does not come within the range of the detector as FIG. 7(b) shows.

It will be understood that some variations can be arranged for the direction of inclined posture of the stick-shaped prism in cantilever form from the embodiment drawn in FIG. 6, within the aim and the effect mentioned above.

FIGS. 8(a)–8(h) further show several embodiments for the stick-shaped prism in cantilever form. All of these embodiments are relevant to that shown in FIG. 6. Instead of the stick-shaped prism, being in the inclined posture (FIG. 6), these embodiments in FIGS. 8(a)–8(h) have inclined surfaces on themselves where the light beam passes through, so that these inclined surfaces are not perpendicular to the axis of that light beam. The effect of employing this construction is the same as that in FIG. 6. In the embodiments shown in FIG. 8(a)–FIG. 8(d), the inclined surfaces 101, 102, where the light beam passes through, are formed on the stick-shaped prism 100. A broken line L is the axis of the light beam. In the embodiments in FIGS. 8(e), 8(f), the direction of the inclined surfaces 105, 106 is different from FIG. 8(a)–FIG. 8(d), and is formed by scraping off the portion of the stick-shaped prism where the light beam passes through. In the embodiments in FIGS. 8(g), 8(h), the portion of the inclined surfaces 108, 108 extends from the stick-shaped prism 107.

The embodiment brought fourth by using the stick-shaped prism in cantilever from shown in FIGS. 5(a)–5(f) and FIGS. 8(a)–8(h), and described herein are within the aim of the invention and can be made without departing from the spirit and scope of this invention.

While this invention has been particularly shown and described with reference to the preferred embodiments, it will be understood by those skilled in the art that various changes in form and detail in addition to variations specifically mentioned herein may be made without departing from the spirit and scope of this invention.

This invention for the optical disk drive has various advantaes as follows;

(1) According to the invention, the optical and mechanical system for the optical pick-up head block comprising the rotary acuator 33, the rotary attachment 34, the stick-shaped prism in cantilever form 35, the parallel elastic plates 36a, 36b, the objective lens 38, the attachment member 37 and the focusing coil 39 can have its moving inertia remarkably reduced because the mass of the objective lens 38, the attachment member 37 and the focusing coil 39, which are dominant in developing inertia forces, is only about 1-2 grams in weight, and because the mass of the parallel elastic plates 36a, 36b is extremely light due to its construction, and especially because the mass of the stick-shaped prism 35 is light in weight due to its simple structure. The mass of the rotary actuator 33 and the rotary attachment 34 is generally be excessive in weight, but the inertia associated with rotary movement is never excessive because this mass is concentrated near the center axis of rotation M. If all of the inertia were to be converted into a point mass on the tip portion (the portion of the objective lens 38) for linear motion so as to be compared with the prior art, the point mass for linear motion is approximately 10–20 gram in weight. It will be less than 1/10 of the moving mass in the prior art. Consequently, large accelerations can be achieved using the rotary actuator imparting a small torque, according to the invention, and moreover, high-speed track access, reduction of power consumption and compactness for the system can be achieved easily.

(2) Even if the large acceleration is impart to the rotary actuator and the optical system, high-speed random access and fine trackability will be achieved easily with good stability according to the invention, because the stick-shaped prism in cantilever form 35 and the parallel elastic plates 36a, 36b never vibrate or resonate against the furious movement due to their high stiffness in the direction of the movement, and because the optical axis of the objective lens 38 never incline on occasion.

(3) The stick-shaped prism in cantilever form with the non-uniform thickness above-mentioned is of great use because of the advantage of increasing its stiffness without increasing its moving inertia.

(4) The structures or the arrangements in the inclined posture for the stick-shaped prism in cantilever, that do not bring about the undesirable surface-reflective light beam that may make undesirable images on the detector's surface, are of great use in the aspect of controlling a closed-loop servo or detecting data signals.

What we claim is:

1. An optical disk drive apparatus for recording information on information tracks of an optical disk and playing back recorded information recorded on optical disk using a light beam, said drive apparatus comprising:
   a chassis supporting said apparatus;
   an optical block fixed to said chassis and having therein a light source for producing said light beam and a light detector for detecting reflected light from the optical disk;
   a pickup head located between the optical disk and said optical block for passing the light beam produced by said light source and the reflected light from the optical disk between the optical disk and said optical block;
   a rotary actuator on said chassis for rotating said pick-up head to move said pick-up head in a direction parallel to a surface of the optical disk;
   said pickup head comprised of a rotary attachment connected to said rotary actuator and rotated by said rotary actuator about an axis of rotation of said rotary attachment, a stick-shaped prism mounted as a cantilever fixed at one end to said rotary attachment for being rotated by said rotary attachment and being free at the other end, supporting means fixed to said rotary attachment at one end for rotation with said rotary actuator in said parallel direction, the other end of said supporting means being movable in a direction perpendicular to the surface of the optical disk relative to said stick-shaped prism, an objective lens for focusing said light beam produced by said light source of said optical block on the surface of the optical disk and for allowing the reflected light to pass therethrough, said objective lens mounted on the other end of said supporting means for rotation therewith in said parallel direction when said supporting means is rotated by said rotary actuator and for movement in said perpendicular direction therewith for focus adjustment for said objective lens, said prism extending between said objective lens and said optical block for forming an optical path for guiding the light beam from said optical block through said prism and to said objective lens and for guiding the reflected light passing through said objective lens back to said optical block; and
   means for moving said other end of said supporting means and said objective lens in the direction perpendicular to said surface of said optical disk for the focus adjustment for said objective lens.

2. The apparatus as claimed in claim 1 wherein,
said prism has a reflective surface at the end of said prism fixed to said rotary actuator located on said axis of rotation and said prism has another reflective surface at the free end located on an optical axis of said objective lens.

3. The apparatus as claimed in claim 1 wherein,
said prism is thicker at the end of the prism fixed to said rotary actuator then at said free end for providing said prism with a high stiffness and a low mass of inertia.

4. The apparatus as claimed in claim 1 wherein,
said prism is inclined relative to a plane perpendicular to said axis of rotation so that the outer surfaces of said prism through which the light beam and the reflected light pass are not perpendicular to the light beam and the reflected light for preventing slight surface-reflected light beams from being produced by said prism.

5. The apparatus as claimed in claim 1 wherein,
the outer surfaces of said prism through which the light beam and the reflected light pass are not perpendicular to the light beam and the reflected light for preventing slight surface-reflective light beams from being produced by said prism.

6. The apparatus as claimed in claim 1 wherein,
said supporting means comprises an attachment member fixed to said objective lens and a pair of elastic plates each of which is parallel to the surface of the optical disk and fixed at one end to said rotary attachment and at the other end to said attachment member.

7. An optical disk drive apparatus for recording information on information tracks of an optical disk and playing back recorded information recorded on optical disk using a light beam, said drive apparatus comprising:

a chassis for supporting said apparatus;

an optical block fixed to said chassis and having therein a light source for producing said light beam and a light detector for detecting reflected light from the optical disk;

a pick-up head located between the optical disk and said optical block for passing the light beam produced by said light source and the reflected light from the optical disk between the optical disk and said optical block;

a rotary actuator on said chassis for rotating said pick-up head to move said pick-up head in a direction parallel to a surface of the optical disk;

said pick-up head comprised of a rotary attachment connected to said rotary actuator and rotated by said rotary actuator about an axis of rotation of said rotary attachment, a stick-shaped prism mounted as a cantilever fixed at one end to said rotary attachment for being rotated by said rotary attachment and being free at the other end, supporting means fixed at one end to said rotary attachment for being rotated by said rotary attachment in said parallel direction, the other end of said supporting means being movable in a direction perpendicular to the surface of the optical disk relative to said stick-shaped prism, an objective lens for focusing said light being produced by said light source of said optical block on the surface of the optical disk and for allowing the reflected light to pass therethrough, said objective lens mounted to said other end of said supporting means, said supporting means comprised of V-shaped parallel elastic plates disposed parallel to the surface of the optical disk and each fixed at one end to said rotary attachment, and an attachment member fixed at the other end of said parallel elastic plates to which said objective lens is mounted and having a focusing coil attached thereto, said prism extending between said objective lens and said optical block for forming an optical path for guiding the light beam from said optical block through said prism and to said objective lens and for guiding the reflected light passing through said objective lens back to said optical block; and a stationary focusing magnetic circuit mounted on said chassis and having a plurality of magnetic yokes and plurality of permanent magnets spaced for forming an air gap in which said focusing coil is located, said focusing magnetic circuit associated with said focusing coil for moving said attachment member having said objective lens mounted thereto in the direction perpendicular to said surface of said optical disk for focus adjustment for said objective lens.

8. The apparatus as claimed in claim 7 wherein, said prism is thicker at the end of the prism fixed to said rotary actuator than at said free end for providing said prism with a high stiffness and a low mass of inertia.

9. The apparatus as claimed in claim 7 wherein, said prism is inclined relative to a plane perpendicular to said axis of rotation so that the outer surfaces of said prism through which the light beam and the reflected light pass are not perpendicular to the light beam and the reflected light for preventing slight surface-reflective light beams from being produced by said prism.

10. The apparatus as claimed in claim 7 wherein, said prism has a central access perpendicular to said axis of rotation.

11. The apparatus as claimed in claim 7 wherein, said prism has outer surfaces through which the light beam and the reflected light pass that are not perpendicular to the light beam and the reflected light for preventing slight surface-reflective light beams from being produced by said prism.

* * * * *